(12) United States Patent
Aguirre et al.

(10) Patent No.: US 8,882,419 B2
(45) Date of Patent: Nov. 11, 2014

(54) PICK-UP TRUCK BOX AND ACCESSORY INTERFACE SYSTEM

(75) Inventors: Adrian Aguirre, Xochimilco (MX); Pedro Antonio Romero Oceguera, Xochimilco (MX); Alberto Soto Marin, Colonia Huichapan (MX); Alana Anne Strager, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/564,168

(22) Filed: Aug. 1, 2012

(65) Prior Publication Data

US 2014/0035320 A1    Feb. 6, 2014

(51) Int. Cl.
*B60P 7/14* (2006.01)
*B60P 7/135* (2006.01)

(52) U.S. Cl.
USPC ............................ 410/106; 410/2; 410/121

(58) Field of Classification Search
USPC ......... 410/102, 107, 111, 108, 109, 110, 112, 410/113, 114, 116, 106; 248/499
See application file for complete search history.

(56) References Cited

U.S. PATENT DOCUMENTS

| | | | |
|---|---|---|---|
| 3,351,356 A | 11/1967 | Clark et al. | |
| 3,572,755 A * | 3/1971 | Baldwin | 410/110 |
| 4,650,382 A | 3/1987 | Johnson | |
| 4,850,770 A | 7/1989 | Millar, Jr. | |
| 5,419,603 A | 5/1995 | Kremer et al. | |
| 5,733,082 A | 3/1998 | Schrader | |
| 5,823,601 A | 10/1998 | Stanesic et al. | |
| RE36,073 E * | 2/1999 | Kremer et al. | 296/39.2 |
| 5,904,390 A | 5/1999 | Emery et al. | |
| 5,927,787 A | 7/1999 | Emery et al. | |
| 6,039,520 A * | 3/2000 | Cheng | 410/106 |
| 6,106,206 A | 8/2000 | Spier et al. | |
| 6,644,901 B2 | 11/2003 | Breckel | |
| 6,783,313 B1 | 8/2004 | Huang | |
| 7,001,122 B2 | 2/2006 | Bommarito et al. | |
| 7,080,966 B2 * | 7/2006 | Roh | 410/102 |
| 2003/0034664 A1 | 2/2003 | Wayne | |
| 2008/0080948 A1 | 4/2008 | Barclay de Tolly et al. | |
| 2011/0042990 A1 | 2/2011 | Holt | |
| 2011/0084510 A1 | 4/2011 | Marean | |

* cited by examiner

*Primary Examiner* — Glenn Dayoan
*Assistant Examiner* — Sunsurraye Westbrook
(74) *Attorney, Agent, or Firm* — Raymond L. Coppiellie; Brooks Kushman P.C.

(57) ABSTRACT

An interface system is provided for a truck box. A recess is formed in a sidewall of the truck box that is covered by a face plate. An interface apparatus may be inserted through an opening formed in the face plate. Sliding blocks may be included that are spring biased outwardly to permit an anchor portion of the interface apparatus to be compressed and inserted through the opening. The sliding blocks are then expanded within the recess to hold the interface apparatus to the sidewall of the truck box. A backing plate may be attached to an inside surface of the sidewall.

24 Claims, 4 Drawing Sheets

PICK-UP TRUCK BOX AND ACCESSORY INTERFACE SYSTEM

TECHNICAL FIELD

This disclosure relates to a pick-up truck box and an interface system for securing cargo and accessories to the pick-up truck box.

BACKGROUND

Trucks for transporting cargo are well known and are widely used in business and for recreation. Some truck owners customize the pick-up truck box to provide convenient interface points for tie downs that are used to secure tools, motorcycles, recreation vehicles, containers, or other cargo. Some pick-up truck owners may drill holes in the pick-up truck box or use existing holes or other structural features such as edge flanges or the top end of the bed wall to provide interface points for accessories. Drilling holes in a pick-up truck box increases the extent of corrosion, disrupts the integrity and reduces the strength of the structure. Using existing structural features to secure objects to a pick-up truck box may not meet all of a user's needs and requirements.

The use of aluminum to fabricate the sidewalls and floor of a pick-up truck has been proposed to achieve substantial weight savings. In prior art steel bed pick-up trucks it is common for users to drill holes in the sidewalls or bed to establish customized tethering locations. Drilling holes and securing heavy objects to anchors or fasteners to a truck bed having aluminum sidewalls and an aluminum bed may not be effective due to the lower strength of aluminum.

This disclosure is directed to addressing the above problems and other problems as summarized below.

SUMMARY

This disclosure provides a system for interfacing with the box of a truck bed that creates a "platform" for user customization to meet the user's individual needs. The truck box is provided by the original equipment manufacturer, in part, as standard equipment. The truck box may be internally reinforced by a backing plate that extends around a recessed area formed in the sidewall or floor of the truck bed. An interface plate may be provided as an upgrade to provide several different options for securing cargo to the truck bed.

According to one aspect of this disclosure, a truck bed is provided that comprises an interior bed wall having an Class A surface and an interior surface. The term "Class A surface" as used in this application refers to the painted vehicle exterior surface and the term "interior surface" refers to the inner side of a panel that is enclosed during assembly. The interior bed wall has a recessed area in the Class A surface that forms a protrusion in the interior surface. A reinforcement plate defines an opening and is attached to the interior surface with the opening receiving the protrusion. An anchor may be attached in locations where the wall is backed by the reinforcement plate to conform to minimum strength standards.

According to additional aspects of the truck bed disclosure, the reinforcement plate is attached to the interior surface where the protrusion emerges from the interior surface and is attached by fasteners to the interior bed wall. The fasteners may be rivets. A plurality of anchor receptacles that extend through the interior bed wall and the reinforcement plate may be provided in the interior bed wall. The anchors are received in the anchor receptacles. The anchors in one embodiment are screws and the anchor receptacles are tapped holes.

According to another aspect of the truck bed disclosure, a face plate may be attached to the interior bed wall that forms a pocket with the recessed area behind the face plate. The face plate forms a shoulder overhanging the pocket. The recessed area may be at least partially formed by the interior bed wall and may include a base wall and a plurality of tapered sidewalls that are tapered outwardly from the base wall to an open side of the recess. The face plate defines an opening that is smaller than the recessed area in the Class A surface. The shoulder may be formed by a portion of the face plate that partially extends over the recessed area.

According to another aspect of this disclosure, an interface system is provided for attaching objects to a truck box. A receptacle may be formed by a surface of the truck box and a face plate. The face plate forms a shoulder overhanging the pocket formed behind the face plate. An interface apparatus is provided that includes an external portion and an anchor portion that is compressed to pass through the shoulder and is expanded to be retained in the pocket.

The anchor may include a detent assembly that includes a biasing device that urges at least one movable part, such as a block or pin, to be retained by the shoulder to hold the interface apparatus in the receptacle. The biasing device may further comprise a spring disposed in a channel formed in the anchor. An external portion of the interface apparatus may be a cleat, a tie down, bungee cord, carabineer, a container, or other similar apparatus.

According to another aspect of the disclosure, the interface system may further comprise a reinforced accessory anchor system that includes a backing plate attached to an interior surface. The recess in the Class A surface of the wall of the truck box forms a raised portion on the interior surface of the wall. The backing plate may define an opening that receives the raised portion and a peripheral flange that extends about the opening. A plurality of fasteners may be inserted through a rim of the face plate, the wall and a peripheral flange of the backing plate to secure and reinforce the face plate. The plurality of fasteners may be a first set of fasteners and may further comprise a second set of fasteners that are inserted through the sidewall and the backing plate to secure the backing plate to the wall before the face plate is attached by the first set of fasteners.

According to another aspect of this disclosure, an interface system is provided for a truck box comprising a surface of the truck box defining one or more recesses, a face plate covering the recess and a detachable anchor. The recess has a width dimension W in a first direction and the face plate defines an opening having a width that is less than the dimension W in the first direction. The face plate has a rim that extends about the opening and is attached to the surface with the opening providing access to the recess with a portion of the rim extending inwardly from the recess. The detachable anchor includes an external portion and a base. The base is inserted through the opening in the face plate in a compressed condition and expands in the first direction into the recess behind the face plate in the first direction in an expanded condition to retain the base within the recess.

According to other aspects of the disclosure, the recess is a formed by a depression in the surface of the truck box that has a base wall and a plurality of sidewalls that extend from the base wall to an open side that defines the width dimension X. The base wall and plurality of sidewalls forming the depression is a continuous surface that does not define any openings through the truck box. The depression may be a rectangular, square, polygonal, circular, oval or similarly shaped depression. The face plate may define a plurality of holes in which a plurality of fasteners is inserted to attach the face plate to the surface of the truck box.

The external portion may be a tie-down eyelet, a cleat or a container. A bungee cord, rope, cable or other similar device may be used to attach objects to the eyelet or cleat in the pick-up truck box. Alternatively, a container may be secured to the pick-up truck box with specialized clips or clamps.

The above aspects of the disclosure and other aspects will be better understood in view of the attached drawings and the following detailed description of the illustrated embodiments.

DETAILED DESCRIPTION

A detailed description is provided below of the illustrated embodiments of the present disclosure. The disclosed embodiments are examples of the invention that may be embodied in various and alternative forms. The figures are not necessarily to scale. Some features may be exaggerated or minimized to show details of particular components. The specific structural and functional details disclosed are not to be interpreted as limiting, but merely as a representative basis for teaching one skilled in the art how to apply the disclosed concepts.

Figure 1:
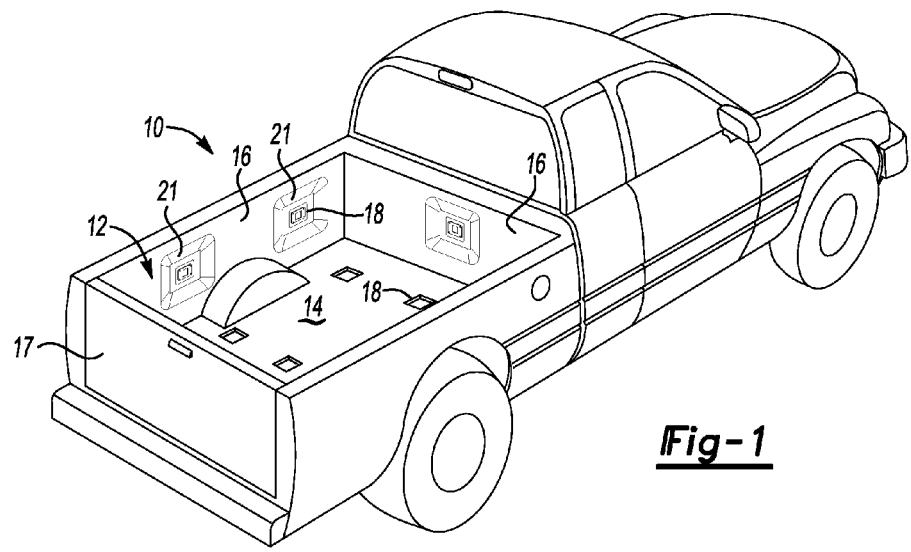
FIG. 1 is a perspective view of a pick-up truck show the truck box with the disclosed interface system.

Referring to FIG. 1, a pick-up truck 10 that includes a truck box 12 is illustrated. The truck box 12 includes a truck bed 14 and sidewalls 16 that extend about three sides of the truck bed 14. The tailgate 17 of the pick-up truck 10 may also function as a sidewall 16 on a fourth side of the truck bed 14.

A plurality of recesses 18 are shown in both the truck bed 14 and sidewalls 16 of the truck box generally indicated by reference numeral 12. The recesses 18 may be formed in a larger depression 21 formed in the sidewall 16. The depression provides added strength for supporting objects connected to the sidewall 16. The depressions 21 set the recesses back into the sidewall 16 so that an anchoring device does not take up cargo space in the truck bed area.

Figure 2:
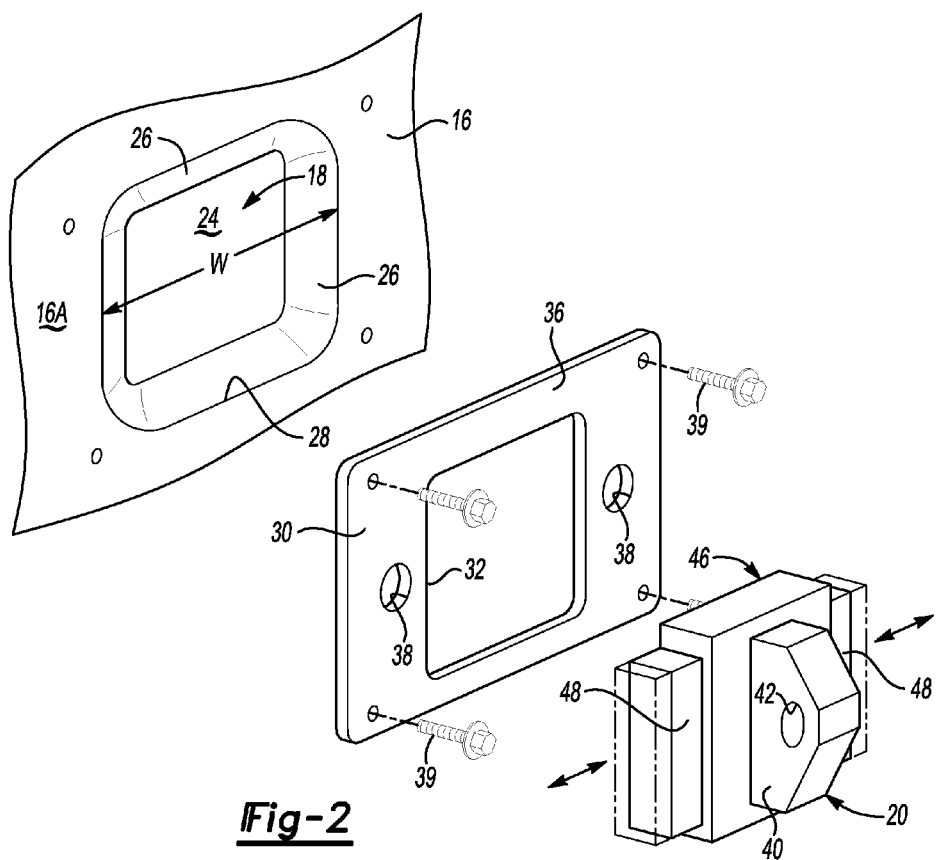
FIG. 2 is an exploded perspective view of a recess, cover plate and interface apparatus anchor.

Referring to FIG. 2, a section of the sidewall 16 is shown with a recess generally indicated by reference numeral 18 formed in the sidewall 16. The portion of the sidewall 16 visible in FIGS. 1 and 2 is the Class A surface and is identified as 16A. The recesses 18 are adapted to receive an interface apparatus 20. The recess 18 includes a base wall 24 and four sidewalls 26. The sidewalls 26 extend from the base wall 24 to the perimeter of an open side 28 of the recess 18. A face plate 30 defines an opening 32 that is adapted to receive the interface apparatus 20 or other anchoring device. A rim 36 is provided that extends about the face plate 30. A pair of hook receiving holes 38 may be provided to secure cargo directly to the face plate 30. The face plate is secured over the recess 18 and to the sidewall 16 by fasteners 39.

A cleat 40 forms part of the interface apparatus 20. The cleat 40 is provided with a receptacle 42 that is adapted to receive a hook, rope or the like. The cleat 40 may be used to secure an object to the interface apparatus 20. An anchor portion 46 is adapted to be received within the recess 18. The anchor portion 46 includes a pair of sliding blocks 48, or pins, that may be compressed in the direction shown by the arrows in FIG. 2 so the anchor portion 46 may be inserted through the opening 32 in the face plate 30.

Figure 3:
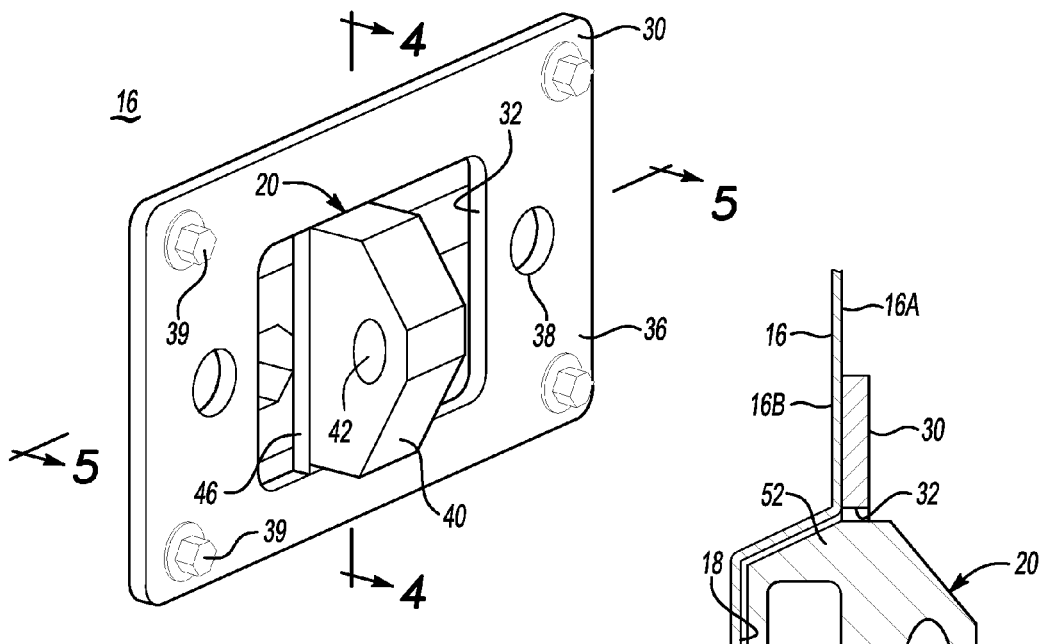
FIG. 3 is a perspective view of a face plate and interface apparatus anchor attached to a sidewall of a pick-up truck box.
Figure 4:
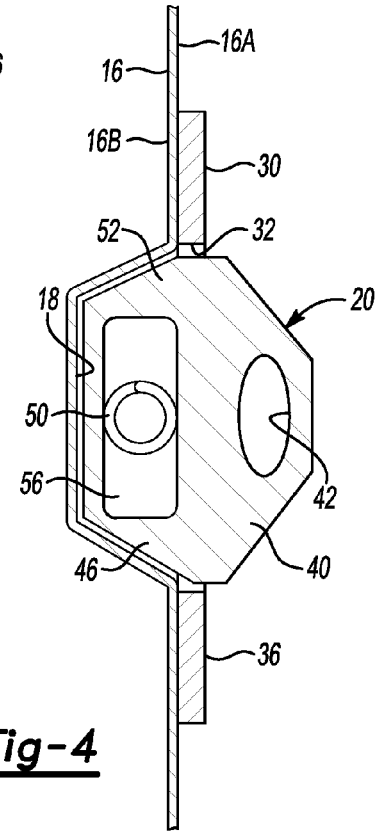
FIG. 4 is a cross-sectional view taken along the line 4-4 in FIG. 3.
Figure 5:
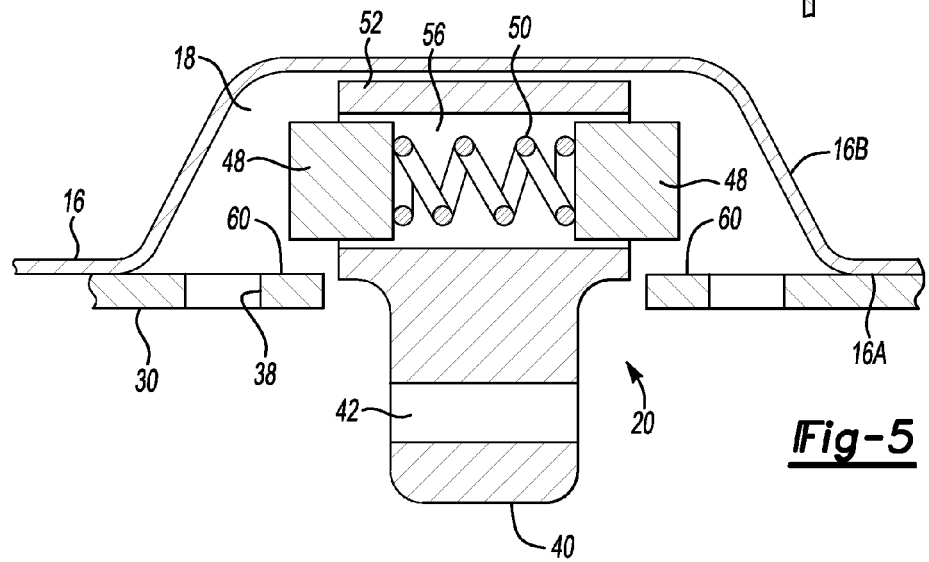
FIG. 5 is a cross-sectional view taken along the line 5-5 in FIG. 3.

Referring to FIGS. 3-5, an interface apparatus 20 is shown secured to include the anchor portion 46 and the cleat 40. The face plate 30 may be secured to the Class A surface 16A of the sidewalls 16 by fasteners 39. With continued reference to FIGS. 3-5 and with specific reference to FIG. 4, the interface apparatus 20 is shown secured in the recess 18. The face plate 30 is secured to the sidewall 16 as previously described and the interface apparatus 20 is inserted within the opening 32 of the face plate 30. Referring to FIGS. 4 and 5, the interface apparatus 20 includes the cleat 40 and an anchor portion 46. The anchor portion 46 is received behind the face plate 30. The anchor portion 46 includes a housing 52 that defines a channel 56, or passageway. A spring 50 is inserted in the channel 56. The spring 50 exerts an outward biasing force on the two sliding blocks 48.

Referring to FIG. 5, the integrated and flexible pick-up box interface apparatus 20 is shown as it is inserted in the recess 18 behind the face plate 30. The Class A surface 16A and the interior surface 16B of the sidewall 16 are identified in FIGS. 4-6 and 8. The spring 50 urges the blocks 48 outwardly from the housing 52 and into the recess 18. The sliding blocks 48 extend outwardly from the housing 52 and are received behind a shoulder 60 formed by the face plate 30 overhanging the recess 18. The cleat 40 defines a receptacle 42 that may be used to secure cargo.

Figure 6:
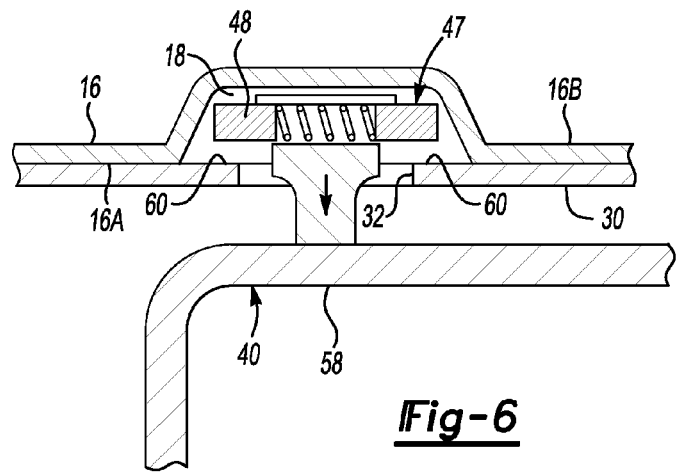
FIG. 6 is a fragmentary cross-sectional view of a container secured to the pick-up truck box wall.

Referring to FIG. 6, an alternative embodiment is illustrated in which a container 58 is secured to a sidewall 16. The sidewall 16 defines recess 18 that is partially covered by the face plate 30. Opening 32 is provided in face plate 30. The container 58 is secured to an anchor portion 47 that secures the container 58 to the sidewall 16 after the sliding blocks 48 are compressed to insert the anchor portion 47 through the opening 32 and is then expanded to retain the anchor portion 47 within the recess 18. A shoulder 60 is formed by the face plate 30 overhanging the recess 18. The sliding blocks 48 expand to retain the anchor portion 47 within the recess 18 and also function to support the container 58.

Figure 7:
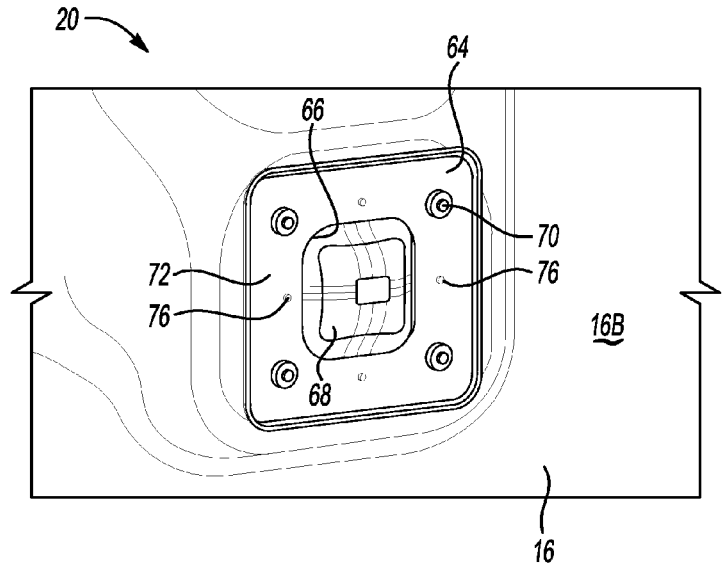
FIG. 7 is an inside perspective view of a backing plate attached to an interior surface of a sidewall of a truck bed.
Figure 8:
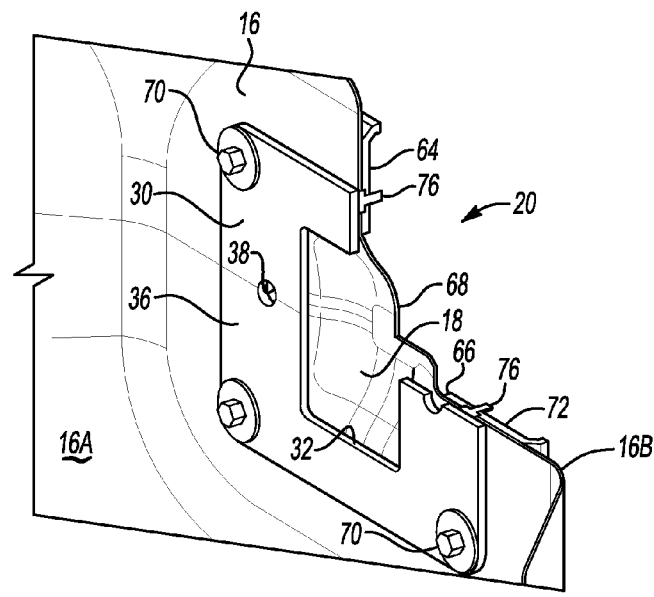
FIG. 8 is a partially cut-away perspective and cross-sectional view of a recess, face plate and backing plate of an embodiment of the interface system.

Referring to FIGS. 7 and 8, an alternative embodiment of the interface system 20 is illustrated that includes a backing plate 64 that is attached to a sidewall 16. The backing plate 64 defines a hole 66 that is adapted to receive a raised portion 68 of the sidewall 16. A plurality of fasteners 70, that are nut and bolt assemblies in the illustrated embodiment, are inserted through the face plate 30, sidewall 16 and a peripheral flange 72 of the backing plate 64. A plurality of backing plate fasteners 76, that are rivets in the illustrated embodiment, are inserted through the sidewall 16 and the peripheral flange 72 of the backing plate 64.

In the embodiment of FIGS. 7 and 8, the interface system 20 is installed by first attaching the backing plate 64 to the sidewall 16. The raised portion 68 of the sidewall 16 is received in the hole 66 of the backing plate 64. The backing plate fasteners 76 are inserted through the sidewall 16 and the peripheral flange 72 of the backing plate 64 to hold the backing plate 64 in position. The face plate 30 is attached to the sidewall 16 by the fasteners 70 that are inserted through the rim 36 of the face plate 30. The sidewall 16, face plate 30 and backing plate 64 may be pre-drilled to receive the fasteners 70, 76.

In either the embodiment of FIG. 1-6 or 7-8, the anchor portion 46 is inserted into the recess 18 through the opening in the face plate 30. The anchor portion 46 may include a cleat 40 that defines a hole 42. Cargo may be secured to the interface system 20 by securing a bungee cord, rope, chain, hook or clip to the cleat 40 or the hook receiving holes 38. Alternatively, a container 58, such as a tool box or the like, may be attached to the anchor assembly 20 by providing the anchor portion 47 or a similar structure on the container 58.

Figure 9:
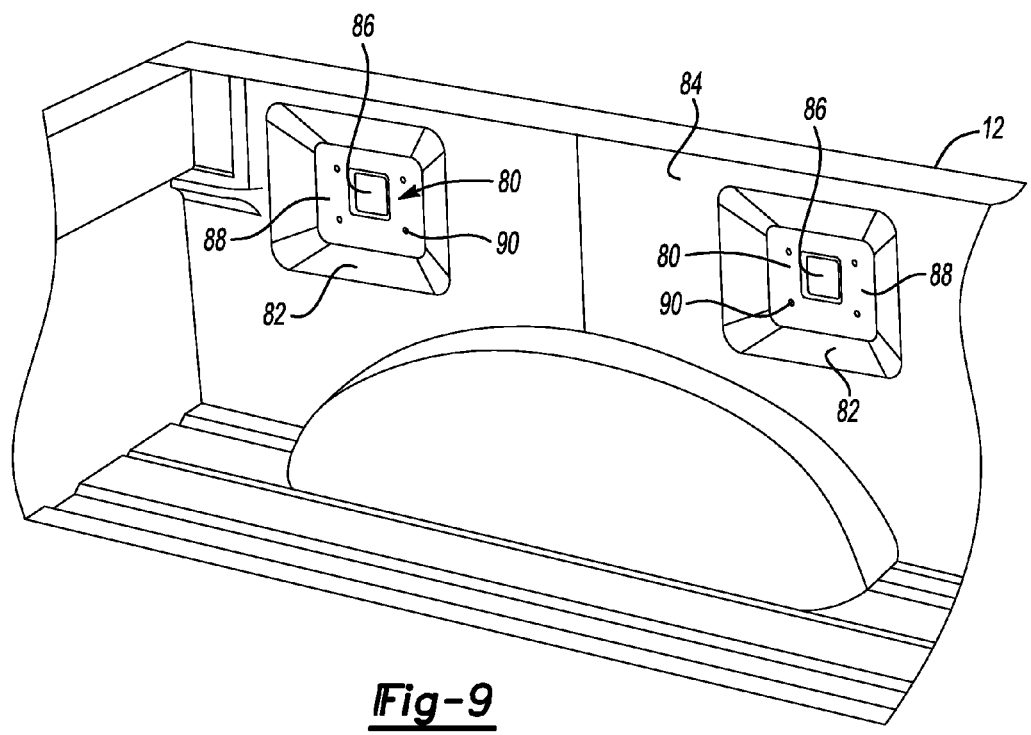
FIG. 9 is a fragmentary perspective view of a sidewall of a truck bed that has a depression and a recessed area within the depression that includes four tapped holes disposed about the recessed area.

Referring to FIG. 9, an alternative embodiment of an interface system 80 is shown in which depressions 82 are formed in the sidewall 84 of a pick-up truck box 12. In this embodiment, no face plate such as that shown in FIGS. 1-6 and 8 is provided. In this embodiment, a recess 86 is formed in a base wall 88. The base wall 88 is reinforced by a backing plate (not shown in FIG. 9) that is similar in structure and in function to the backing plate 64 shown in FIGS. 7 and 8. The backing plate is secured to the base wall 88 by rivets 76 or other fasteners as previously described with reference to FIGS. 7 and 8. Four tapped holes 90 are provided in the base wall 88. The tapped holes 90 may be provided with fasteners (not shown) or may remain open and ready to receive standard threaded fasteners thereby creating a platform for customization to meet a user's requirements.

Figure 10:
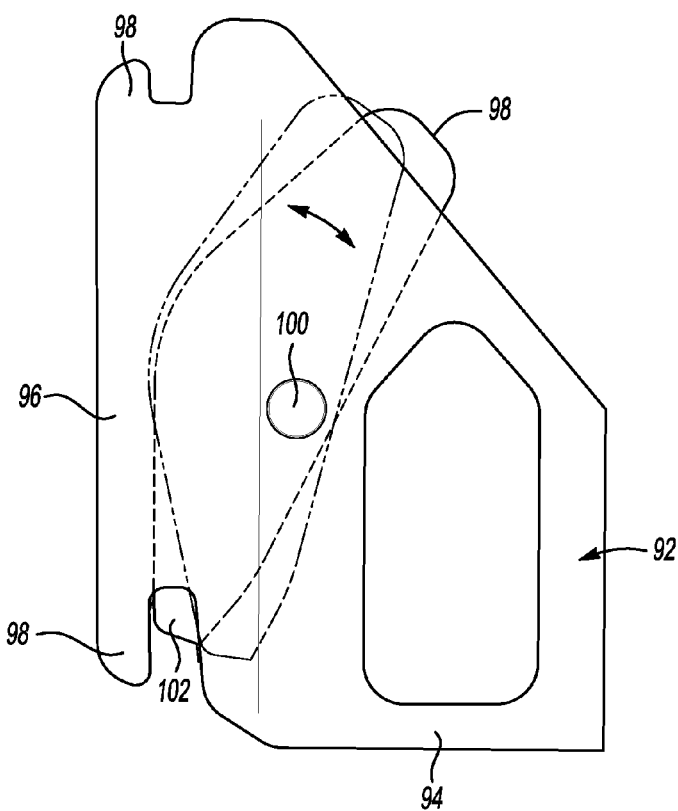
FIG. 10 is an elevation view of a clip that may be attached to a face plate that includes a pivotable locking lever.

Referring to FIG. 10, an alternative embodiment of an interface apparatus 92 is illustrated. The interface apparatus 92 is a clip 94 that includes a base portion 96. The base portion 96 includes ears 98 that are adapted to be received behind a face plate 30 as shown in the embodiment of FIGS. 1-8. A pivoting locking element 98 is pivotable about a pivot pin 100. The locking element 98 has a locking tip 102 that is moved into engagement with the opening 32 after the ears 98 of the clip 94 are inserted behind the face plate 30. (The face plate 30 and opening 32 are shown in FIG. 2.) It should be understood that many different types of clips, containers or other types of restraints may be anchored to the interface systems 10 or 80.

While exemplary embodiments are described above, it is not intended that these embodiments describe all possible forms of this disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A truck bed comprising:
   an interior bed wall having a Class A surface and an interior surface, and defining a recessed pocket in the Class A surface forming a protrusion in the interior surface;
   a reinforcement plate defining an opening, and being attached to the interior surface with the opening receiving the protrusion, wherein an anchor is attachable in locations where the wall is backed by the reinforcement plate in conformance with minimum strength standards.

2. The truck bed of claim 1 wherein the reinforcement plate is attached to the interior surface where the protrusion emerges from the interior surface and is attached by fasteners to the interior bed wall.

3. The truck bed of claim 2 wherein the fasteners are rivets and a plurality of anchor receptacles are provided in the interior bed wall that extend through the interior bed wall and the reinforcement plate, wherein the anchors are receivable in the anchor receptacles.

4. The truck bed of claim 3 wherein the anchors are screws and the anchor receptacles are tapped holes.

5. The truck bed of claim 1 further comprising a face plate attached to the interior bed wall that partially covers the recessed pocket, and wherein the face plate forms a shoulder over hanging the pocket.

6. The truck bed of claim 5 wherein the recessed pocket is at least partially formed by the interior bed wall and includes a base wall and a plurality of tapered sidewalls that are tapered outwardly from the base wall to an open side of the recessed pocket.

7. The truck bed of claim 5 wherein the face plate defines an opening that is smaller than the recessed pocket in the Class A surface and wherein the shoulder is formed by a portion of the face plate that partially extends over the recessed pocket.

8. An interface system for attaching objects to a truck box comprising:
   a wall of the truck box having a surface that defines a recessed pocket;
   a face plate attached to the wall that partially covers the recessed pocket, and wherein the face plate forms a shoulder over hanging the pocket; and
   an interface apparatus including an external portion and an anchor, wherein the anchor is compressible to pass through the recess and is expandable to be retained by the shoulder in the pocket.

9. The interface system of claim 8 wherein the recessed pocket is formed by the wall of the truck box and includes a base wall and a plurality of tapered sidewalls that are tapered outwardly from the base wall to an open side of the recessed pocket.

10. The interface system of claim 9 wherein the face plate defines an opening that is smaller than the open side of the recessed pocket and wherein the shoulder is formed by the face plate that partially extends over the recess.

11. The interface system of claim 8 wherein the anchor includes a detent assembly that includes a biasing member that urges at least one sliding block to extend behind the shoulder to hold the interface apparatus on the face plate.

12. The interface system of claim 11 wherein the biasing member comprises a spring disposed in an opening in the anchor.

13. The interface system of claim 8 wherein the interface apparatus is a cleat.

14. The interface system of claim 8 wherein the recessed pocket defined by the surface of the wall of the truck box forms a raised portion on an interior surface of the wall, the interface system further comprising:
   a backing plate attached to the interior surface, the backing plate defining an opening that receives the raised portion in a peripheral flange that extends about the opening; and
   a plurality of fasteners extending through the face plate, the wall and the backing plate to secure and reinforce the face plate.

15. The interface system of claim 14 wherein the plurality of fasteners is a first set of fasteners, and wherein the system further comprises a second set of fasteners that extend through the wall and the backing plate to secure the backing plate to the wall before the face plate is attached by the first set of fasteners.

16. The interface system of claim 8 wherein the wall of the truck box is a sidewall of the truck box.

17. An interface system for a truck box comprising:
a wall defining a recessed pocket in a Class A surface of the truck box, the recessed pocket having a width dimension W in a first direction;
a face plate defining an opening having a width that is less than the dimension W in the first direction, the face plate having a rim that extends about the opening, wherein the rim extends inwardly from the recessed pocket and is attached to the surface with the opening that provides access to the recessed pocket; and
an interface apparatus including an external portion and an anchor portion that is inserted through the opening in the face plate in a compressed condition and that expands into the recessed pocket behind the face plate in the first direction in an expanded condition to retain the anchor portion within the recessed pocket.

18. The interface system of claim 17 wherein the recessed pocket is a depression in the surface of the truck box that has a base wall and a plurality of sidewalls that extend from the base wall to an open side that defines the width dimension W.

19. The interface system of claim 18 wherein the base wall and plurality of sidewalls forming the recessed pocket form a continuous surface that does not define any openings through the truck box.

20. The interface system of claim 18 wherein the face plate further defines a plurality of holes, and a plurality of fasteners are inserted into the holes to attach the face plate to the surface of the truck box.

21. The interface system of claim 18 wherein the interface apparatus includes a hold down hole.

22. The interface system of claim 18 wherein the recessed pocket in the Class A surface defined by the wall of the truck box forms a raised portion on an interior surface of the wall, the interface system further comprising:
a backing plate attached to the interior surface, the backing plate defining an opening that receives the raised portion and a peripheral flange that extends about the opening; and
a plurality of fasteners extending through the rim of the face plate, the wall and the backing plate to secure and reinforce the face plate.

23. The interface system of claim 22 wherein the plurality of fasteners is a first set of fasteners and further comprising a second set of fasteners that extend through the wall and the backing plate to secure the backing plate to the wall before the face plate is attached by the first set of fasteners.

24. The interface system of claim 17 wherein the interface apparatus is a container.

* * * * *